United States Patent [19]
Mukai et al.

[11] 3,858,492
[45] Jan. 7, 1975

[54] FLAVOR ENHANCEMENT OF MILK FOODSTUFFS

[75] Inventors: Noboru Mukai; Masanobu Kawai, both of Tokyo, Japan

[73] Assignee: Kyowa Hakko Kogyo Kabushiki Kaisha, Tokyo-to, Japan

[22] Filed: May 20, 1971

[21] Appl. No.: 145,515

Related U.S. Application Data

[63] Continuation of Ser. No. 711,854, March 11, 1968, abandoned.

[30] Foreign Application Priority Data
Mar. 14, 1967 Japan.............................. 42-15577

[52] U.S. Cl.................................... 426/36, 426/34
[51] Int. Cl..... A23c 9/00, A23c 15/00, A23c 19/00
[58] Field of Search .................. 99/115, 116, 59, 54; 195/62

[56] References Cited
UNITED STATES PATENTS

| | | | |
|---|---|---|---|
| 3,097,145 | 7/1963 | Shimazono et al. .................. | 195/62 |
| 3,348,952 | 10/1967 | Hoti et al.............................. | 99/116 |
| 3,607,655 | 9/1971 | Mukai et al........................... | 195/62 |

*Primary Examiner*—David M. Naff
*Attorney, Agent, or Firm*—Meyer A. Gross

[57] ABSTRACT

The flavor of milk foodstuffs is enhanced with a good dairy flavor in a simpler way and in a shorter time by contacting the foodstuff with an enzyme-containing substance derived from a microorganism belonging to the Basidiomycetes group.

8 Claims, No Drawings

3,858,492

FLAVOR ENHANCEMENT OF MILK FOODSTUFFS

The present application is a continuation of application Ser. No. 711,854, filed Mar. 11, 1968, now abandoned.

BACKGROUND OF INVENTION

It is known to enhance, for example, green cheese, which has been prepared by adding a starter and rennet to sterilized non-human animal's milk to give a curd and removing the whey from the curd, and enhancing the socalled dairy flavor by ripening the green cheese in a ripening room at about 5°–15°C for about 4–6 months. Sometimes, green cheese is ripened for very long time, such as 2 years, according to the type of the cheese. This process requires a very long time for ripening, as well as being expensive and inefficient.

In order to overcome such difficulties in improving the flavor of dairy foodstuffs, we have now discovered that the dairy flavor of non-human animal's milk and its processed products (hereinafter designated as milk foodstuffs), such as cheese, butter, milk drinks, milk cream, powdered or condensed milk etc. can be enhanced within a shorter period of time and in a simpler manner according to the process of the present invention as compared with the long ripening periods required by the prior processes.

An object of the present invention is, therefore, to provide a process for enhancing milk foodstuffs with a good dairy flavor.

Another object of the present invention is to provide milk foodstuffs enhanced with a good dairy flavor in improved manner.

The present invention is also directed to the provision of an enzyme capable of enhancing milk foodstuffs with a good dairy flavor and a process for producing the same.

Other objects and features of the present invention will be apparent upon reading the following specification and claims.

SUMMARY OF INVENTION

According to the present invention, there is provided a process for producing an enzyme capable of enhancing milk food stuffs with a good dairy flavor, which is characterized by culturing a microorganism belonging to Basidiomycetes group in a liquid or solid medium under aeration conditions, said medium containing a carbon source and nitrogen source so as to accumulate the enzyme therein and separating the enzyme therefrom.

Basidiomycetes group which may be used for the purpose of the present invention requires nutrient and include for example as follows:

| Genus | Species | Deposition No. |
|---|---|---|
| Fomitopsis | Fomitopsis pincola (Fr)Karst | ATCC 20036 |
| Irpex | Irpex lacteus | IFO 5367 |
| Lenzites | Lenzites saepiaria | ATCC 9419 |

The foregoing microorganisms are freely available on an unrestricted basis to the public at these culture collections.

Basidiomycetes group according to the present invention can advantageously be cultured in liquid medium under aeration-agitation conditions, although solid medium can also be used for the same purpose.

It is possible to use any of the suitable mediums containing nutrients necessary for the growth of Basidiomycetes group such as assimilable carbon source and nitrogen source. Preferred carbon sources include, for example, starch, dextrin, sacchrose, lactose, maltose, glucose, waste molasses, wood saccharification spent liquor, etc. Preferably nitrogen sources include, for example, ammonium salts, nitrates, corn steep liquor, peptone, meat extract, soybean powder, wheat bran, yeast, yeast extract, urea etc. If desired, various organic or inorganic compounds such as e.g. salts of calcium, magnesium, sodium, zinc, copper, iron etc. may be added to the medium. It is also possible to incorporate micronutrients such as e.g. vitamins, various growth-promoting substances, buffering agents, etc.

The cultivation is carried out at a pH of within about 2 to 7 and at a temperature within the range of about 20° to 38°C, preferably 28° to 34°C. The accumulation of the flavor-enhancing enzyme according to the present invention in the culture medium normally reaches a maximum after about 3 to 10 days of cultivation.

Because non-human animal's milk or its processed products contain in general various nutrients useful for the growth of the microorganism according to the present invention, it is also possible to use for example suitable non-human animal's milk as the culture medium with addition of suitable nitritive sources, growth-promoting substances, activator for the enzyme etc. In this case, the flavor-enhancing enzyme from the cultured microorganism is naturally placed in contact with the medium, for example, non-human animal's milk without additional treatment thereby enhancing the latter's dairy flavor as the cultivation proceeds.

The accumulated enzyme can be separated by way of example in the cultured medium by the extraction of the solid medium with water or a suitable water-soluble medium. The enzyme-containing solution can be obtained from the liquid medium e.g. by the filtration or centrifugation. The solution is then concentrated (if desired to solid) in a suitable manner such as for example precipitation with organic solvent, salting-out method, concentration in vacuo, cellulose ion exchange resin treatment etc. In one embodiment of the present invention, the enzyme-containing solution is filtered so as to separate from the liquid medium and to it there is added an inorganic salt such as ammonium sulfate and an organic solvent such as alcohol e.g. methanol, ethanol, which can be replaced if desired by a suitable solvent such as acetone or isopropanol. The amounts of the additives depend on the type of the additive, culture conditions etc., but it is possible to obtain precipitates containing the flavor-enhancing enzyme together with various impurities by the addition of ammonium sulfate (about 50–75% by weight of saturating amount thereof) or by the addition of a suitable water-soluble solvent in an amount of about 150–250% v/v, and soluble impurities can be removed from the remaining solution. The precipitates obtained can be dried in vacuo or freeze-dried to solid after the concentration. The substance obtained (hereinafter designated as enzyme-containing substance) includes the enzyme according to the present invention and can be used for enhancing milk food stuffs without any after treatment. If desired, the enzymecontaining substance can be purified further to obtain a highly purified enzyme.

According to another feature of the present invention, there is provided a process for enhancing milk food stuffs, which is characterized by placing a milk food stuff in contact with an enzyme derived from a microorganism belonging to Basidiomycetes group until a sufficient dairy flavor is obtained.

PREFERRED EMBODIMENTS

This process will be described more clearly by way of the following preferred embodiments. The term % w/w is calculated as the percent by weight of the solid contents of the enzyme-containing substance defined above to the corresponding weight parts of milk food stuff. As used in the specification and claims the term "enzyme-containing substance" denotes the enzyme per se, or in combination with other constituents resulting from its production, i.e., not fully purified.

A. The dairy flavor of green cheese obtained in conventional manner can be enhanced in a simpler way and in a shorter time by adding to the green cheese prior to ripening the enzyme-containing substance according to the present invention in an amount of about 0.05–1% w/w and allowing it to stand for example for about 1–5 hours with stirring at about 10°–20°C until a good dairy flavor is obtained.

B. Sweet cream butter is conventionally produced by churning a milk cream so as to collect fat globes and working the same, while ripened cream butter is conventionally produced by the use of a ripened non-human animal's milk, which has been ripened by adding a butter starter thereto, and treating the ripened milk in an analogous manner to that of the production of sweet cream butter.

Good dairy flavor can be imparted to sweet cream butter in a simpler manner and in a shorter time by adding the enzyme-containing substance according to the present invention either before or after churning.

In the former process, good dairy flavor can be obtained by adding to a cream before churning the enzyme according to the present invention in an amount of 0.1–1% w/w together with lactic acid in an amount that would give an acidity of 0.1–0.5% calculated as lactic acid and standing the resultant mixture at 15°–40°C with stirring until a sufficient dairy flavor is obtained. In the latter process which is simpler than the former, even though the enhanced dairy flavor is not stronger than that obtained by the former, a churned cream is added with the enzyme according to the present invention in an amount of 0.1–1% w/w and the resultant mixture is then worked at 15°–25°C until a sufficient dairy flavor can be obtained (for example for 1–10 hours).

C. Milk drinks containing lactic acid, such as yogurt, can be given a good dairy flavor in a simpler way and in a shorter time in an analogous manner by the use of the enzyme according to the present invention. It is preferred to use the enzyme-containing substance in an amount of about 0.05–1% w/w and lactic acid in an amount that would suffice to give an acidity of 0.5–1% calculated as lactic acid.

D. Non-human animal's milk such as whole milk, powdered milk and condensed milk can also be given a good dairy flavor in a simpler way by the use of the enzyme-containing substance of the present invention preferably in an amount of 0.05–1% by weight of solid content therein.

The enzyme-containing substance of the present invention can be used directly without further purified product for enhancing the dairy flavor of various milk food stuffs, such as chocolate, cakes, baby foodstuff, ice cream, margarine etc.

The following non-limitative examples further illustrate the invention.

EXAMPLE 1

A liquid medium (20 litres) containing sacoharide (5% w/w), corn steep liquor (2% w/w), yeast extract (0.03% w/w) and small amounts of inorganic salts was adjusted to a pH of 5.0. After sterilization, the medium was inoculated with a strain of *Fomitopsis pincola* (Fr) Karst (ATCC 20036) and was cultured for 120 hours at 30°C (400 r.p.m.; aeration of 15 litres per minute). The filtration removed microbial bodies from the culture medium. To the filtrate was added ammonium sulfate (70% of the saturating amount) to give precipitates, which were then centrifuged and freeze-dried to yield a substance containing the enzyme of the present invention.

The enzyme-containing substance was then added to a green cheese prepared in conventional manner (0.5% w/w). After working for 2 hours at 15°C there was obtained an agreeable cheese with enhanced dairy flavor similar to that of conventionally ripened cheese.

EXAMPLE 2

A strain of *Irpex lacteus* (IFO 5367) was cultured in a similar medium under similar conditions to those described in Example 1 and was filtered to remove microbial bodies. The filtrate was treated with ammonium sulfate in a similar manner to that described in Example 1 to give a substance containing the enzyme. A sterilized milk cream containing fat (about 35% w/w) was added with said substance (0.13% w/w) together with lactic acid so as to give an acidity of 0.15% calculated as lactic acid. The mixture was then stirred well at 37°C for about 4 hours, from which a sweet cream butter was thereafter prepared in a conventional manner. The butter obtained had an enhanced good dairy flavor similar to that of the conventional ripened cream butter.

EXAMPLE 3

A powdered whole milk (cow's milk) was diluted with water to give a 40% w/w solution, which was sterilized at 30°C for 5 minutes. After cooling, the solution was added the enzyme-containing substance obtained by the use of a strain of *Lenzites saepiaria* (ATCC 9419) in a similar manner to that described in Example 1 in an amount of 0.5% w/w. After leaving it at 30°C for 3 hours with mild stirring, the mixture was heated at 80°C for 15 minutes. The resulting solution was spray-dried with hot air having a temperature of 100°–110°C to yield a powdery product enhanced with a strongly dairy flavor similar to that of the conventional cream butter or cheese. It was possible to enhance chocolate cake, baby foodstuff, etc., with an agreeable flavor by the addition of the powdered milk thus obtained in an amount of about 0.2–2% w/w.

EXAMPLE 4

A sterilized milk cream containing 35% w/w of fats was mixed with lactic acid so as to give an acidity of 0.2% calculated as lactic acid together with the enzyme-containing substance obtained in a similar manner to that described in Example 1 (0.12% w/w). The mixture was heated to 37°C for about 3 hours with mild stirring. A sweet cream butter having a good flavor similar to that of the conventional ripened cream butter was obtained when a sweet cream butter was prepared by using the mixture according to this example as the raw material.

EXAMPLE 5:

A skim milk (8% solids w/w) was mixed with a skim milk powder (5% w/w) and sucrose (8% w/w) and the mixture was sterilized at 80°C for 30 minutes. The mixture was then cooled to 37°C and to it added the enzyme-containing substance (0.05% w/w) obtained in a similar manner to that described in Example 1. After stirred mildly for 3 hours, the addition of lactic acid (1% w/w) resulted in the coagulation to yield a sour milk drink enhanced with a good dairy flavor similar to that of the conventionally ripened cheese or butter.

EXAMPLE 6

A 40% w/w solution of powdered whole milk was sterilized at 90°C for 5 minutes and was cooled to 35°C. After the addition of the enzyme-containing substance obtained in a similar manner to that described in Example 1 in an amount of 0.5% w/w, the mixture was left at 35°C for 2½ hours with mild stirring. The reaction was discontinued by heating at 80°C for 15 minutes, and then the reaction mixture was spraydried with hot air having a temperature of 100°-110°C to give a powdery substance, which had a strongly dairy flavor similar to that of the conventionally ripened cheese. It was observed that chocolate, cakes, baby foodstuff etc. were enhanced with an agreeable flavor by the addition of the substance thus obtained in an amount of about 0.1-2% w/w.

EXAMPLE 7

A green cheese obtained in conventional manner was enhanced with a good dairy flavor similar to that of the conventionally ripened cheese by adding to the green cheese the enzyme-containing substance obtained in a similar manner to that described in Example 2 in an amount of 0.5% w/w and allowing it to stand at 15°C for about 3 hours while thoroughly stirring.

EXAMPLE 8

A green cheese obtained in conventional manner was enhanced with a good dairy flavor similar to that of the conventionally ripened cheese in a similar manner to that described in Example 7 except the use of a strain of *Fomitopsis pincola* (*Fr*) Karst (ATCC 20036).

EXAMPLE 9

A green cheese obtained in conventional manner was enhanced with a good dairy flavor similar to that of the conventionally ripened cheese in a similar manner to that described in Example 7 except the use of a strain of *Lenzites saepiaria* (ATCC 9419).

EXAMPLE 10

A cultivation was carried out in a similar manner to that described in Example 1 by the use of the similar microorganism. The filtration was carried out for removal of microbial bodies. To the filtrate was added isopropanol (200% v/v) to give precipitates, which were centrifugal and sterilized in vacuo at a temperature below 5°C whereby an enzyme-containing substance of the present invention was obtained.

A powdered whole milk was diluted with water to give a 40% w/w solution and sterilized at 90°C for 5 minutes. After cooling to 35°C, to the solution was added the enzyme-containing substance in an amount of 0.5% w/w. The mixture was then kept at 35°C for about 2½ hours with mild stirring. The reaction was discontinued by heating the mixture at 80°C for 15 minutes. A powdery product was obtained from the reaction mixture by spray-drying with hot air having a temperature of 100°-110°C. The product obtained had a strong dairy flavor similar to that of the conventionally ripened cheese. An agreeable flavor was imparted to chocolate, cakes, baby foodstuff etc. by the addition of the milk product obtained by the addition of enzymecontaining substance in an amount of 0.1-2% w/w.

We claim:

1. A process for imparting to milk foodstuffs an enhanced dairy flavor which comprises placing the milk foodstuff in contact with 0.05 to 1 wt% based on weight of the milk foodstuff of an enzyme derived from a microorganism selected from the group consisting of genus Irpex and Fomitopsis until a sufficient dairy flavor is obtained.

2. A process for producing the enzyme used in the process of claim 1 wherein the medium is a liquid medium and the microorganism is cultured at a pH of 2-7, and a temperature ranging from 20° to 38°C for 3-10 days under aeration conditions.

3. The process of claim 1 wherein said microorganism is selected from the strains consisting of *Fomitopsis Pinincola* (Fr) Karst (ATCC 20036) and *Irpex lacteus Fr* (IFO 5367).

4. A process for enhancing green cheese with dairy flavor according to claim 1 wherein the enzyme is added to green cheese prior to ripening in an amount of 0.05-1% w/w (calculated as the weight per cent of the enzyme-containing substance based on weight of green cheese) and the mixture is then ripened with stirring at 10-20°C until a sufficient dairy flavor is obtained.

5. A process for enhancing sweet cream butter with dairy flavor according to claim 1 wherein a churned cream is contacted with the enzyme in an amount of 0.1-1% w/w (calculated as weight percent of the enzyme-containing substance based on weight of cream) and the resultant mixture is then worked at 15°-25°C until a sufficient dairy flavor is obtained.

6. A process for enhancing sweet cream butter with dairy flavor according to claim 1 wherein a milk cream before churning is contacted with the enzyme in an amount of 0.1-1% w/w (calculated as weight percent of the enzyme-containing substance based on weight of cream butter) together with lactic acid which would give an acidity of 0.1-0.5% calculated as lactic acid and resultant mixture is then left at 15°-40°C with stirring until a sufficient dairy flavor is obtained.

7. A process for enhancing sour milk with dairy flavor according to claim 1 wherein the milk drink is contacted with the enzyme in an amount of 0.05-1% w/w (calculated as the weight percent of the enzyme-containing substance based on weight of milk) and lactic acid in an amount which would give an acidity of 0.5-1% calculated as lactic acid and is then allowed to stand until a sufficient dairy flavor is obtained.

8. A process for enhancing animal's milk with dairy flavor according to claim 1 wherein the milk is contacted with the enzyme in an amount of 0.05–1% w/w (calculated as the weight per cent of the enzyme-containing substance based on weight of milk) and is allowed to stand until a sufficient dairy flavor is obtained.

* * * * *